Figure 1:
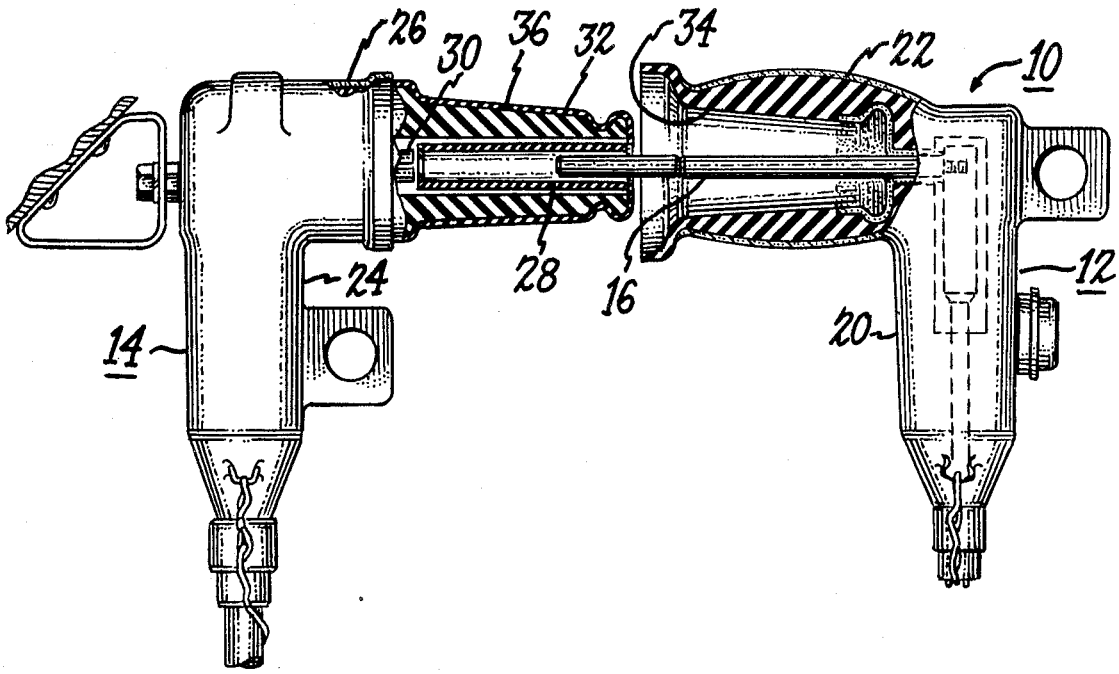

United States Defensive Publication [19] (H) [11] T953,007

Tachick et al. [43] Dec. 7, 1976

[54] SHIELDED ELECTRIC POWER CABLE SEPARABLE CONNECTOR MODULE HAVING A MATING SURFACE COATED WITH A RESIN-BONDED SOLID FILM LUBRICANT

[75] Inventors: Henry N. Tachick, Pittsfield, Mass.; Leonard M. Small, Somersworth, N.H.

[73] Assignee: General Electric Company

[21] Appl. No.: 656,639

[22] Filed: Feb. 9, 1976

Related U.S. Application Data

[63] Continuation of Ser. No. 544,038, Jan. 27, 1975, abandoned.

[51] Int. Cl.[2] ..... H01R 15/04

[52] U.S. Cl. ..... 339/111

[57] ABSTRACT

A shielded cable separable connector module is of the type having a contact assembly inside an insulating housing of elastomeric material. The housing includes a mating portion having a configuration suited for intimate engagement with a corresponding mating portion of a matching second module for establishing contact with the contact assembly of the second module. The improvement comprises a coating of phenolic resin-bonded polytetraflouroethylene solid film lubricant on the surface of at least the mating portion of the first module housing. A silicone grease may be used in addition to the solid film lubricant coating, if desired.

1 Claim, 1 Sheet Drawing,

5 Pages Specification

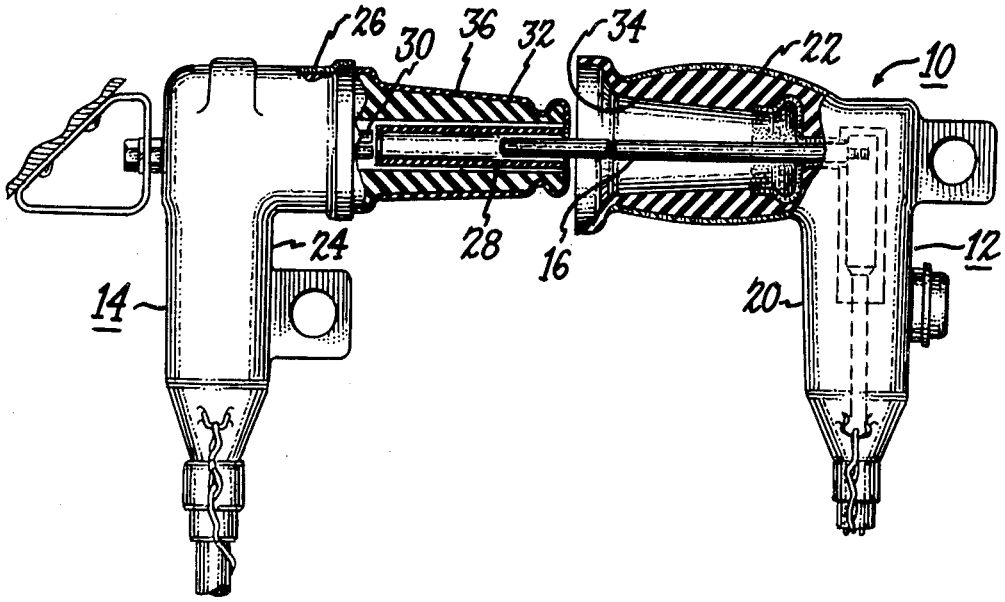

The file of this unexamined application may be inspected and copies thereof may be purchased (849 O.G. 1221, Apr. 9, 1968).